United States Patent [19]

Jakubowicz et al.

[11] Patent Number: 4,593,837

[45] Date of Patent: Jun. 10, 1986

[54] VARIABLE VOLUME PIPETTE

[75] Inventors: Raymond F. Jakubowicz, Rush; Stuart G. MacDonald, Webster, both of N.Y.

[73] Assignee: Eastman Kodak Company, Rochester, N.Y.

[21] Appl. No.: 711,949

[22] Filed: Mar. 15, 1985

[51] Int. Cl.[4] .............................................. G01F 11/28

[52] U.S. Cl. ................................. 222/288; 73/864.17; 239/391; 222/144.5; 222/145

[58] Field of Search ..................... 222/288, 144.5, 145, 222/275, 566, 567, 278, 139, 140, 141; 73/864.14, 864.17; 239/390, 391, 396

[56] References Cited

U.S. PATENT DOCUMENTS

| | | | |
|---|---|---|---|
| 3,131,868 | 5/1964 | Coleman | 239/390 X |
| 3,640,434 | 2/1972 | Walker | 222/144.5 |
| 3,831,618 | 8/1974 | Liston | 73/864.12 X |
| 4,141,250 | 2/1979 | D'Autry | 73/864.17 |
| 4,304,138 | 12/1981 | Tervamaki | 73/864.17 |
| 4,327,595 | 5/1982 | Schultz | 73/864.17 X |

*Primary Examiner*—Joseph J. Rolla
*Assistant Examiner*—Jay I. Alexander
*Attorney, Agent, or Firm*—Dana M. Schmidt

[57] ABSTRACT

There is disclosed a pipette useful with disposable tips, comprising a plurality of differently-sized pistons and a piston chamber for each piston. Each piston chamber has a vent passageway extending to the exterior surface of the pipette. The pipette is improved in that the mounting means for mounting a disposable tip comprises, not one surface, but a plurality of differently-sized surfaces. Furthermore, the vent passageway for all but the smallest piston chamber exits at a location in between the mounting surface for the tip of that particular piston chamber and the next smaller mounting surface, whereby the larger disposable tips seal over the vent passageways of the smaller disposable tips.

6 Claims, 8 Drawing Figures

VARIABLE VOLUME PIPETTE

FIELD OF THE INVENTION

This invention relates to devices for aspirating and dispensing liquid, such as, pipettes.

BACKGROUND OF THE INVENTION

Variable volume pipettes have been known in the prior art. For example, the pipette described in U.S. Pat. No. 3,640,434, issued on 2/8/72, uses a plurality of (three) differently-sized and integrally connected pistons, reciprocating in differently (but appropriately) sized piston chambers, to create one of three different aspirating and dispensing volumes. These volumes function using only one size dispensing tip removably mounted on a single mounting surface. The effective volume is determined by a complex valving member that selectively opens, or cuts off, one, two or three of the vent paths emanating from the piston chambers. The valving member is actuated by rotating a sleeve to open or cut off the vents. The problems with such a device include, (a) the valving member's complexity can lead to malfunctions, and (b) the user must determine which setting the sleeve is on, since this is not automatically determined by any step in preparing the pipette Inadvertence, negligence, or even distraction on the part of the user can lead to an inappropriate volume being used.

What has been desired, therefore, prior to this invention, is a variable volume pipette in which the selection of the pipette's volume is more positively, and yet more simply, controlled by the use of the pipette to avoid malfunctions and inappropriate use of the pipette.

SUMMARY OF THE INVENTION

We have discovered that the volume dispensed from a variable volume pipette can be controlled by the size of the dispensing tip that is mounted on the pipette. Such an arrangement features more than one size dispensing tip, and more specifically, a specific size dispensing tip for each of the variances in the volume. This arrangement permits, for example, a 10:1 variance, or even a 100:10:1 variance, in a triple variance version.

More specifically, such a pipette is designed so that the vent of each piston chamber is enclosed by, or sealed within only, the tip designed for that particular vent, or those tips that are larger.

This invention provides a pipette for dispensing variable volumes and comprising a plurality of piston chambers, a piston constructed to reciprocate within each of the chambers, means for reciprocating the pistons, a passageway extending from each chamber to a next adjacent chamber, a vent passageway extending from each of the chambers to the exterior of the pipette, and mounting means for mounting disposable tips on the pipette. The pipette is improved in that the mounting means comprise differently-sized mounting surfaces for mounting differently-sized disposable tips, and in that all but one of the vent passageways exits on the exterior surface of the pipettes at a location disposed between the mounting surface corresponding to the piston chamber vented by each vent passageway and the next smaller mounting surface. As a result the larger disposable tips enclose the vent passageways of the smaller disposable tips.

It is an advantageous feature of the present invention that the variation in the volume is automatically, and yet simply, controlled by the selection of the size of the disposable tip that is mounted on the pipette.

It is a related advantageous feature of the present invention that the effective volume of the pipette's piston chambers is controlled by a simple mechanism that is not likely to be erroneously adjusted by the user.

It is a further related advantageous feature of the present invention that the selection of a volume of the possible variable volumes with this pipette is achieved without using any moving parts which are susceptible to wear.

Other advantageous features will become apparent upon reference to the following Detailed Description of the Invention, when read in light of the attached drawings.

DESCRIPTION OF THE PREFERRED EMBODIMENTS

The invention is hereinafter described in connection with a pipette, which is the preferred embodiment. In addition, the invention is useful in any kind of aspirating or dispensing device wherein variability in volumes is desirable. Thus, it is also useful in automated metering devices that are part of large clinical analyzers.

Figure 1:
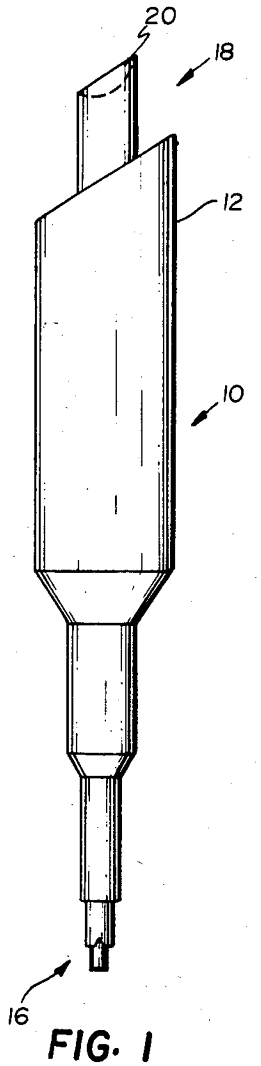
FIG. 1 is a side elevational view of a manual pipette constructed in accordance with the invention before a disposable tip is mounted thereon.
Figure 2:
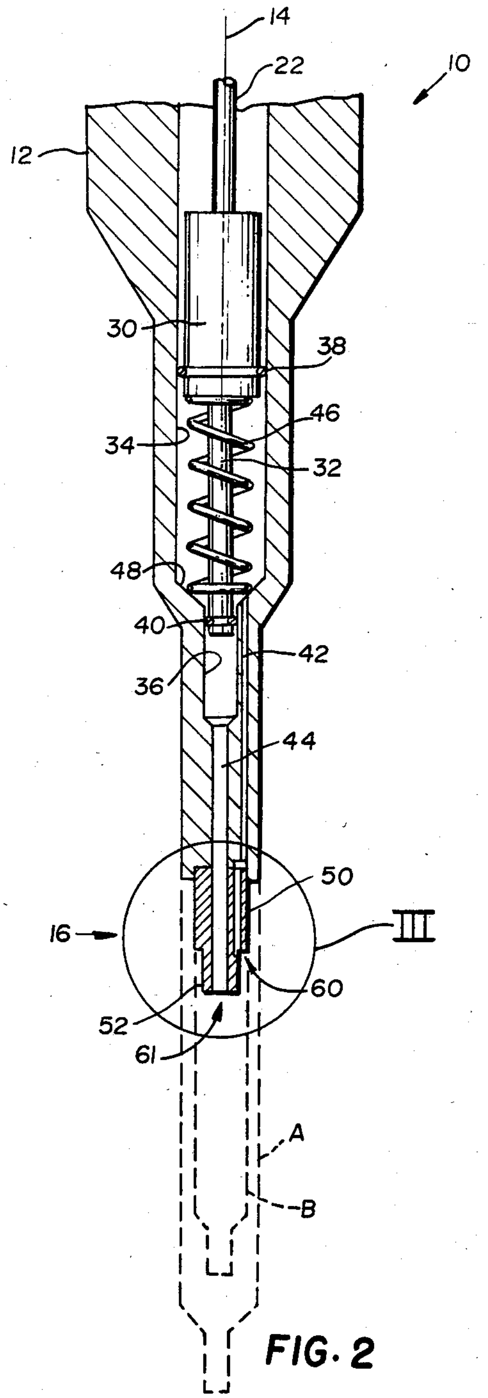
FIG. 2 is a fragmentary cross-sectional view of the tip-mounting end of the pipette of FIG. 1, illustrating the mechanism of the invention.

A pipette 10, FIG. 1, constructed in accordance with the invention comprises a housing 12 having an axis of symmetry 14, FIG. 2. One end 16 of the pipette used for tip-mounting is press-fit into housing 12. Preferably, housing 12 is metal, although it can be plastic in the alternative, which has the advantage of allowing the housing to be molded as one piece. If plastic is used, preferably the tip-mounting end 16 is provided with a metal sleeve to reduce wear. If all parts are metal, as shown, a bridge aperture 17 is used to align the two parts of the vent passageway 42 discussed below.

The opposite end 18, FIG. 1, of the pipette features an actuating button 20. Button 20 reciprocates within housing 12, as is conventional, by reason of its direct connection, not shown, to pistons 30 and 32 via rod 22, FIG. 2. In a series arrangement such as is shown, the plural pistons are necessarily integrally connected by a single rod. Such serial connection is via a passageway 48 extending between the two chambers. Each of these pistons reciprocates within an appropriately dimensioned piston chamber 34 and 36. Piston rings 38 and 40 act to create a partial vacuum or partial pressure within their respective chambers, depending on the direction of reciprocation. Each of the chambers 34 and 36 is vented to the exterior of the pipette by a passageway 42 and 44, respectively. A return spring 46 disposed between piston 30 and passageway 48 acts as the resilient means for urging rod 22 and button 20 out of the depressed position that occurs by collapsing the spring.

In accord with one aspect of the invention, differently-sized mounting surfaces 50 and 52 are provided at end 16, for differently-sized disposable tips A and B respectively (shown in phantom). The number of such surfaces 50 and 52 coincides with the number of piston chambers in the pipette. Most preferably, such surfaces are truncated cones. These mounting surfaces terminate in respective shoulders 51 and 53 (FIG. 3), used to provide a positive axial stop to the mounted disposable tips.

Any disposable tip is useful with the pipette of the invention, provided the inside diameter of the tip is sized to fit one of the mounting surfaces 50 and 52. For example, a useful disposable tip is that described in U.S. Pat. No. 4,347,875.

Figure 3:
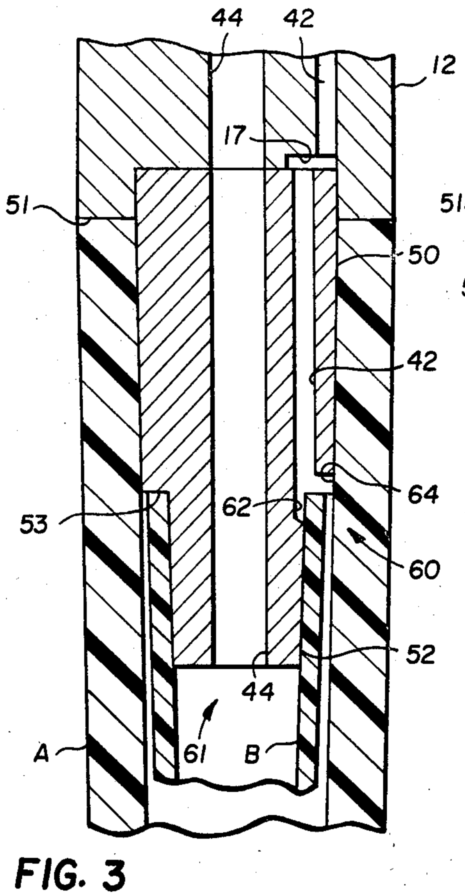
FIG. 3 is an enlarged fragmentary sectional view of the encircled portion of FIG. 2 labeled "III"

In accord with another aspect of the invention, vent passageway 42 exits at the exterior surface of the pipette at a location 60 that is disposed in between surfaces 50 and 52. Passageway 44 exits at a location 61 (FIG. 2) centered within end 16 and between the area circumscribed by surface 52. As will be readily apparent, location 60 is further arranged so that even though a portion 64 is contacted by such tip A, a portion 62, FIG. 3, is left open to (uncontacted by) the interior of the larger tip A that fits on surface 50. In any event, the entire exit 60 is enclosed by tip A so as to seal within that tip, the air volume of chamber 34 that is in communication with exit 60 by passageway 42. This results in the volumes of both chambers 34 and 36 being effective during pipetting, when larger tip A is mounted in place. In contrast, tip B, the smaller of the two tips, when mounted on its mounting surface 52, is unable to completely seal off portion 64 of the exit 60 of passageway 42. As a result, when tip B is in place, only the volume of chamber 36 is effective in aspirating liquid into or dispensing liquid from tip B. By judicious selection of the volumes of chambers 34 and 36, a 10 to 1 variation in volume can be achieved, simply by insuring that the volume of chamber 34 plus the volume of chamber 36 is in a ratio with the volume of chamber 36, that is 10 to 1. This variation is accomplished automatically merely by mounting either the large or the small diameter disposable tip on its mounting surface, without using any movable parts such as switches, valves, or the like.

Figure 4:
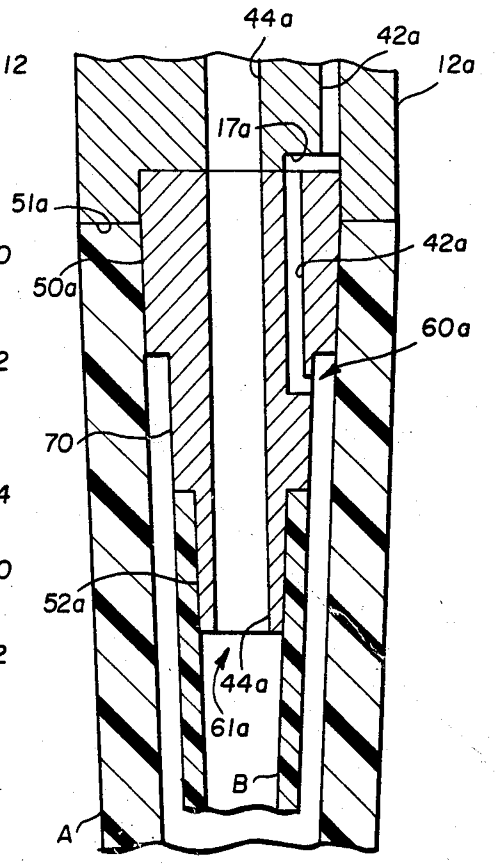
FIGS. 4 and 5 are fragmentary sectional views similar to that of FIG. 3, but illustrating alternative embodiments.

It is not necessary that the larger vent passageway exit exactly at a common terminus of the two differently-sized mounting surfaces, as in FIG. 3. Such an alternate embodiment is shown in FIG. 4. Parts similar to those previously described bear the same reference numeral, to which the distinguishing suffix "a" has been appended. Thus, vent passageways **42*a* and 44*a* extend from the larger and smaller chambers in pipette 10*a*, as before, and differently-sized mounting surfaces 50*a* and 52*a* are provided for the differently-sized disposable tips, shown in phantom. However, unlike the previous embodiment, an additional surface 70 is disposed between surfaces 50*a* and 52*a*. For example, surface 70 can be a truncated cone. It is on this surface that passageway 42*a* exits, at location 60*a***.

It is not essential, though perhaps convenient, that the plural piston chambers be connected in series as described above. Each piston chamber can be provided with its own piston rod and actuating button, not shown. However, the automatic selection of volume merely by selecting and mounting a disposable tip, which does occur in the series mode shown in FIGS. 1–4, occurs only if a single actuating button activates all the pistons of the pipette.

Figure 5:
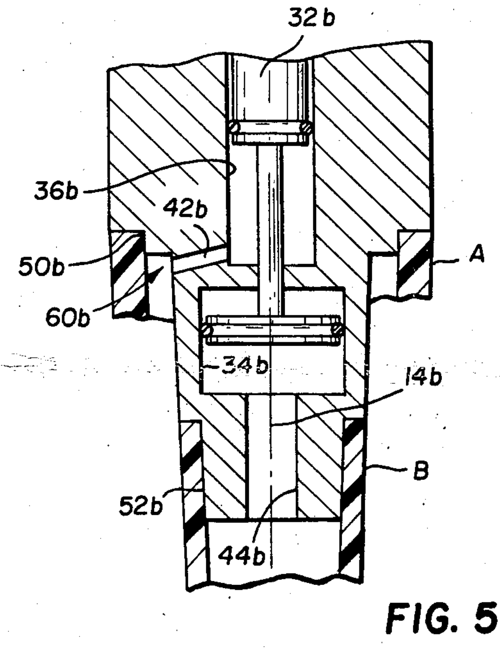
Figure 6:
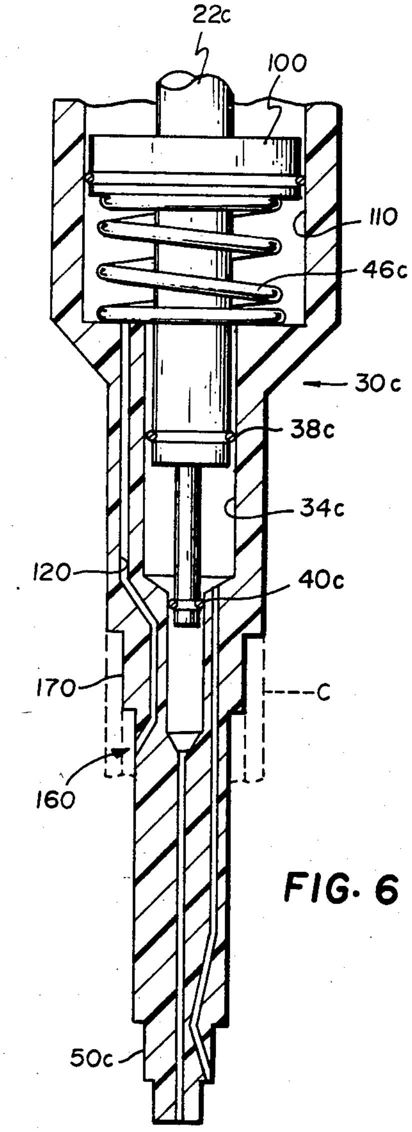
FIG. 6 is a fragmentary sectional view similar to FIG. 2, but illustrating yet another alternative embodiment.

Other variations are also possible, as shown in FIGS. 5 and 6. Parts similar to those previously described bear the same reference numeral, to which the distinguishing suffixes "b" and "c" are appended, respectively. In FIG. 5, the piston chamber communicating with vent passageway **44*b* located on axis 14*b* is the larger of the two chambers, chamber 34*b*. The smaller of the two chambers, chamber 36*b*, is located between chamber 34*b* and the actuating end, not shown, so that the vent passageway of chamber 36*b* is passageway 42*b* that exits at location 60*b* disposed between mounting surfaces 50*b* and 52*b***. In such an arrangement, it will be readily apparent that the volume aspirated into or metered from the larger of the two tips (tip A) is only a fraction larger than the volume involved with the smaller tip, rather than a whole multiple, e.g., 10 units in the larger tip A compared to 9 units in the smaller tip B.

Yet another variation, not shown, is one in which pistons **30*b* and 32*b*** are of identical diameter. The pistons need not be of drastically different diameter. The choice of relative diameters is operative in selecting the volume change occurring when the user mounts the larger disposable tip. Thus, if the two diameters are equal, the volume ratios experienced by switching between the two tips is about 2 to 1.

In FIG. 6, a third piston 100 and piston chamber 110 are disposed, in series, between piston **30*c* (and piston chamber 34*c*) and rod 22*c*. Such chamber has its own vent passageway 120 molded in plastic that exits at a location 160 disposed between mounting surface 50*c* for the middle-sized tip, not shown, and mounting surface 170 for the largest tip C, shown in phantom. In such a case, return spring 46*c* can be mounted in chamber 110. By mounting tip C, of which only a phantom portion is shown in position on surface 170, the combined volumes of all 3** chambers are sealed by tip C and are effective in aspirating and dispensing liquid. Thus, a 3-way variation in volume is achieved, for example, 100:10:1, depending only on the size of the disposable tip that is mounted on the appropriate mounting surface.

Figure 7:
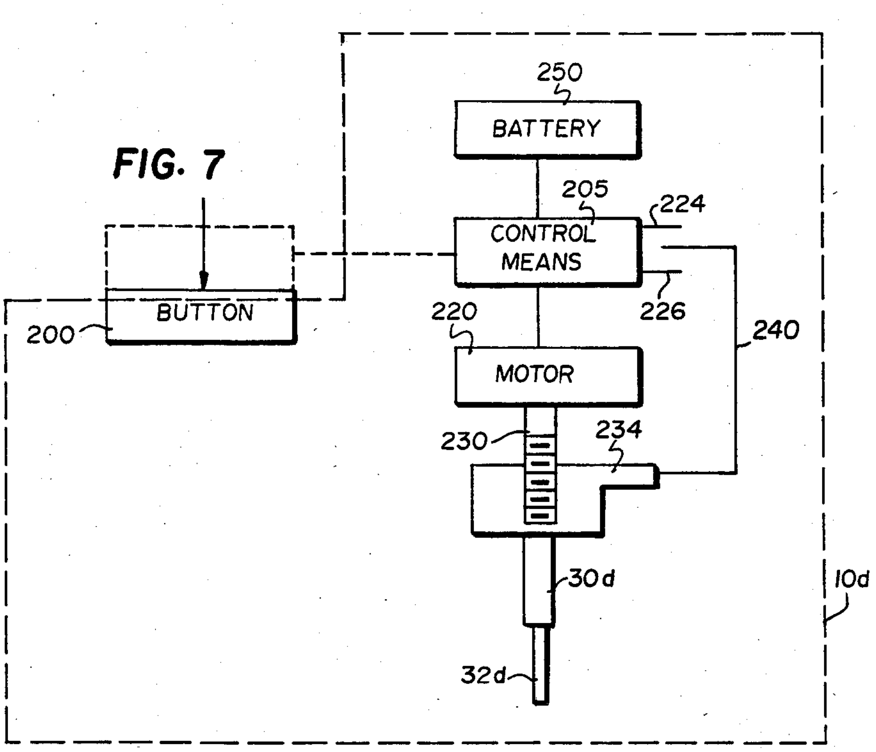
FIG. 7 is a schematic view of an automated embodiment of the invention.

Motorized pipettes may also incorporate this invention. Useful controls for such a pipette **10*d* are shown in FIG. 7. The exterior of such a pipette is substantially the same as is shown in FIG. 1, except that button 20, which has a substantial axial travel distance, is replaced with switch button 200 that travels a short distance until it makes electrical contact to activate control means 205. In addition, connecting rod 22 and return spring 46 are replaced with motor 220 and limit switches 224 and 226. Motor 220, which can be a conventional stepper motor, drives a threaded drive shaft 230 on which is mounted a nut 234 that is prevented from rotating. Thus nut 234 is forced to reciprocate towards and away from motor 220. Pistons 30*d* and 32*d* are directly attached to nut 234, and reciprocate within their chambers as described for the embodiment of FIG. 1. A sensing finger 240 is also mounted on nut 234, to travel between and to actuate limit switches 224 and 226. A suitable energy source such as battery 250 powers motor 220 via the control means 205, which can be any conventional electrical circuit for turning on motor 220 in response to the pressing of button 200**, and for turning off the motor when either switch 224 or 226 is activated. For example, a latch switch, not shown, that includes current reversal half switches and diodes is useful, so that when either limit switch 224 or 226 opens the circuit to turn off the motor, the next activation of button 200 reverses the current flow direction through the armature of motor 220.

Such a latch switch is described in commonly owned U.S. application Ser. No. 540,974, filed by R. F. Jakubowicz on 10/11/83, entitled "Motorized Pipette", now U.S. Pat. No. 4,519,258.

Figure 8:
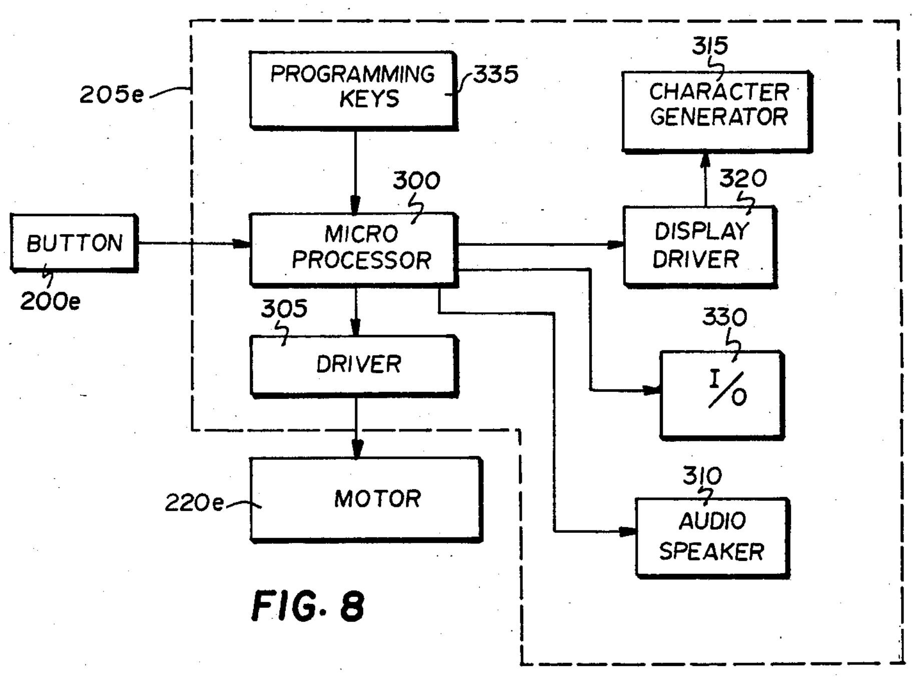
FIG. 8 is a schematic view of the controls that are useful in converting the automated embodiment of FIG. 7 into a reprogrammable, automated embodiment.

Alternatively, control means 205 can be replaced with a microprocessor and programming keys. Such a reprogrammable control means 205*e* is shown in FIG. 8. Parts similar to those previously described bear the same reference numeral, to which the distinguishing suffix "e" is appended. In such a device, button 200*e* activates the control means which in turn drives motor 220*e*, as described in the previous embodiment. Any conventional microprocessor 300 is used, for example a single chip such as is available as Hitachi HD63P01 from Hitachi, to drive driver 305. The latter driver comprises, for example, FET switches that turn on motor 220*e*. Preferably, both an audio and a visual output are provided, the audio being delivered as a beep through speaker 310. The visual output is delivered via conventional character generator means 315 driven by a conventional display driver 320 which utilizes bits of binary code to turn on appropriate segments for display. In addition, 1/0 means 330 comprising any conventional interface is preferably included so as to permit external communication. Driver 320 and I/0 means 330 can be included in a single microprocessor chip, e.g., chip HD 63L05 manufactured by Hitachi.

Such a reprogrammable control means 205*e* is controlled via conventional programming keys 335. Such keys can include function keys such as a selector switch that allows the selection of one of several functions, such as "dilution" (to allow aspiration of sample and diluents such as water or buffer), "multi-dispense" (which dispenses each time only a fraction of the liquid in the disposable tip instead of all of it), etc. The programming of microprocessor 300 to allow such control is conventional and requires no further discussion.

It will be readily apparent that the switchover from one variable volume to another, in such a motorized pipette, is still initiated by the selection of a differently-sized disposable tip to fit one of several differently-sized mounting surfaces, and thus cover or uncover respective vent passageways, as described above. In addition, the programming keys can be optionally programmed to alter fractionally the volume to be delivered by the differently-sized tips. Thus, if the larger tip normally aspirates and dispenses 100 μl, while the smaller aspirates and dispenses 10 μl as controlled by the invention, one of the keys 335 can be used to, e.g., halve that relationship. That is, such a key causes motor 220*e* to travel only half its distance, thus aspirating and/or dispensing only 50 μl and 5 μl, respectively.

The invention has been described in detail with particular reference to preferred embodiments thereof, but it will be understood that variations and modifications can be effected within the spirit and scope of the invention.

What is claimed is:

1. In a pipette for dispensing variable volumes and comprising a plurality of piston chambers, a piston constructed to reciprocate within each of said chambers, means for reciprocating said pistons, a passageway extending from each chamber to a next adjacent chamber, a vent passageway extending from each of said chambers to the exterior of the pipette, and mounting means for mounting disposable tips on the pipette;

the improvement wherein said mounting means comprises differently-sized mounting surfaces for mounting differently-sized disposable tips, and wherein all but one of said vent passageways exits on the exterior surface of said pipette at a location disposed between the mounting surface corresponding to the piston chamber vented by said each vent passageway, and the next smaller mounting surface, whereby the larger disposable tips enclose the vent passageways of the smaller disposable tips.

2. In a pipette for dispensing variable volumes and comprising first and second piston chambers, first and second pistons constructed to reciprocate within said chambers, means for reciprocating said pistons, means defining a first passageway extending from said first chamber to said second chamber and a second passageway fluidly connecting said first chamber to the exterior of said pipette to form a vent, and mounting means for mounting dispensing tips on said pipette;

the improvement wherein said mounting means comprises first and second differently-sized mounting surfaces for mounting first and second differently-sized disposable tips, such first disposable tips being larger in diameter and in volume than such second disposable tips, said vent exiting on the exterior surface of said pipette at a location disposed in between said first and second mounting surfaces, and said mounting surfaces having diameters that cause said first disposable tips but not said second disposable tips to surround and enclose said vent.

3. A pipette as defined in claim 2, wherein said diameters of said second piston and piston chamber are larger than said diameters of said first piston and piston chamber.

4. A pipette as defined in claim 2, wherein said diameters of said first piston and piston chamber are larger than said diameters of said second piston and piston chamber.

5. A pipette as defined in claim 1 or 2, wherein said reciprocating means includes a motor.

6. A pipette as defined in claim 5, and further including means for electronically altering the amount of travel of said pistons provided by said motor.

* * * * *